Sept. 29, 1970     K. W. MILLER ET AL     3,531,053

STEAM DISTRIBUTION SYSTEM

Original Filed Oct. 6, 1967     2 Sheets-Sheet 1

INVENTORS
KENYON W. MILLER
CLIFFORD D. SHELOR

BY *Thomas W. Flynn*

ATTORNEY

Sept. 29, 1970  K. W. MILLER ET AL  3,531,053
STEAM DISTRIBUTION SYSTEM
Original Filed Oct. 6, 1967  2 Sheets-Sheet 2
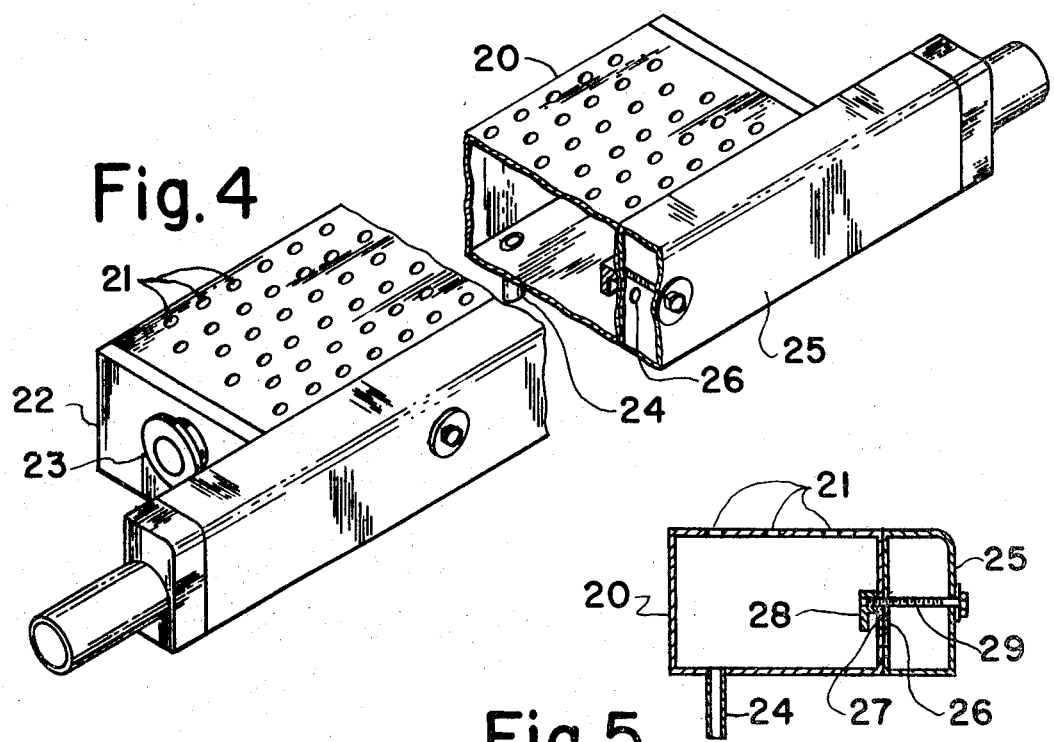
Fig.4
Fig.5
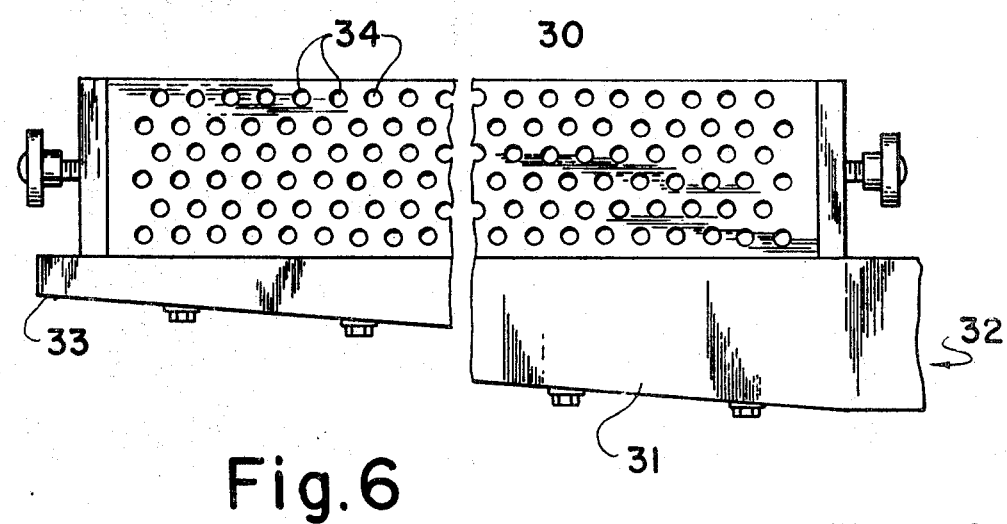
Fig.6
INVENTORS
KENYON W. MILLER
CLIFFORD D. SHELOR
BY Thomas W. Flynn
ATTORNEY

United States Patent Office 3,531,053
Patented Sept. 29, 1970

1

3,531,053
STEAM DISTRIBUTION SYSTEM
Kenyon W. Miller, Winchester, and Clifford D. Shelor, Covington, Va., assignors to Westvaco Corporation, New York, N.Y., a corporation of Delaware
Continuation of application Ser. No. 673,487, Oct. 6, 1967. This application Oct. 9, 1969, Ser. No. 866,129
Int. Cl. B05b 1/14
U.S. Cl. 239—553.3     11 Claims

ABSTRACT OF THE DISCLOSURE

A steam distribution chamber for applying a uniform blanket of steam to a moving web of paper or the like utilizes a feed manifold, hydrodynamically designed to have a uniform pressure throughout its length, to feed steam to the distributing chamber at equal pressures and velocities. The manifold may be positioned either internally or externally of the chamber and a baffle or baffles may be used to help disperse the steam as it issues from the manifold.

---

This application is a continuation of Ser. No. 673,487 filed Oct. 6, 1967, now abandoned.

BACKGROUND OF THE INVENTION

Field of the invention

The distribution of fluids at substantially uniform pressures and velocities by an elongated distribution chamber.

Description of the prior art

It is known to design a fluid conduit having a series of outlets along its length in a manner such that the pressure losses due to friction and pressure gains due to deceleration offset each other to give a substantially uniform pressure and velocity at each of the conduit outlets. (See Keller, The Manifold Problem, Journal of Applied Mechanics, March 1949, pages 77–85).

For example, in a conduit having a constant diameter and outlets of uniform size and spacing, the ratio of active length of the manifold to the diameter thereof ($L/D$) and the ratio of the sum of the outlet areas to the cross-sectional area of the manifold (area ratio) may be proportioned to give a substantially constant pressure along the active length of the conduit.

For a smooth steel pipe delivering steam an $L/D$ ratio of approximately 100 and an area ratio of approximately 1 have been found to give this result; although of course, the different frictional characteristics of different materials may require some deviation from these values.

Where only the cross-sectional area of the conduit need be uniform, the size and/or spacing of the outlets may be varied to give uniform pressure at each of the conduit outlets. Conversely, where the size and spacing of the outlets must be uniform, the cross-sectional area of the conduit may be varied so that the friction losses and deceleration gains balance each other and result in uniform pressures along the conduit length.

However, in many installations, the length and diameter of the conduit and the size and spacing of its outlets will be governed by factors other than the theoretical design considerations necessary to obtain uniform outlet pressures.

Consider, for example, a process where it is desired to apply a uniform blanket of steam at some particular volume and velocity to a continuously moving web of material such as paper or the like. This might be done to change its surface characteristics, modify a previously applied coating, etc.

The width of the web to be treated would determine the minimum active length of the conduit. The spacing of the outlets would be determined by the desired heat transfer characteristics of the system, while the desired volume and outlet velocity of the steam would influence the diameter of the conduit and size of the outlets.

It will be apparent that with so many of the conduit dimensions influenced by the specific installation in which it is to be used, it will often be impractical, if not impossible, to dimension the conduit to give equal pressures at each of its outlets.

It is also known to use a feed conduit or manifold having a series of outlets along its length to feed fluid to a second conduit, which acts as a distribution chamber. Apparatus of this type is shown in U.S. Pats. Nos. 1,031,960; 1,642,154; 1,997,651; 2,809,867; and 3,097,994. In none of these devices however, insofar as applicants are aware, is provision made for hydrodynamically designing the feed conduit to give uniform pressures at each of its outlets. In Kemp, 1,642,154, for example, the distributing conduit in each of the embodiments shown is divided by partitions into a series of distribution the chambers and the fluid flow from each of the outlets of the feed conduit to each of the distribution chambers is controlled by means of a series of valves.

SUMMARY OF THE INVENTION

In accordance with the principles of the present invention, the fluid pressure and velocity at each of the distributing chamber outlets is substantially equal to that at each of the other outlets even though the distributing chamber dimensions and the size and spacing of its outlets are not hydrodynamically proportioned to give this result.

This is accomplished by means of a feed manifold which extends either internally or externally of the distributing chamber and is hydrodynamically designed to give uniform fluid pressures and velocities at each of its outlets. As a result, the interior of the distributing chamber is supplied at a number of points throughout its length with fluid at uniform pressure and velocity. Since these points will usually be fairly closely spaced, the interior of the distributing chamber, in effect, will be under substantially uniform pressure. As a result, the jets of fluids issuing from the distributing chamber will be at substantially uniform pressure and velocity even though the chamber itself is not designed to give this result.

BRIEF DESCRIPTION OF THE DRAWINGS

FIG. 4 is a perspective view similiar to FIG. 2 showing a second preferred embodiment of the invention;

FIG. 5 is a cross-sectional view through the apparatus of FIG. 4; and

FIG. 6 is a plan view of a third preferred embodiment of the present invention.

DESCRIPTION OF THE PREFERRED EMBODIMENTS

Figure 1:
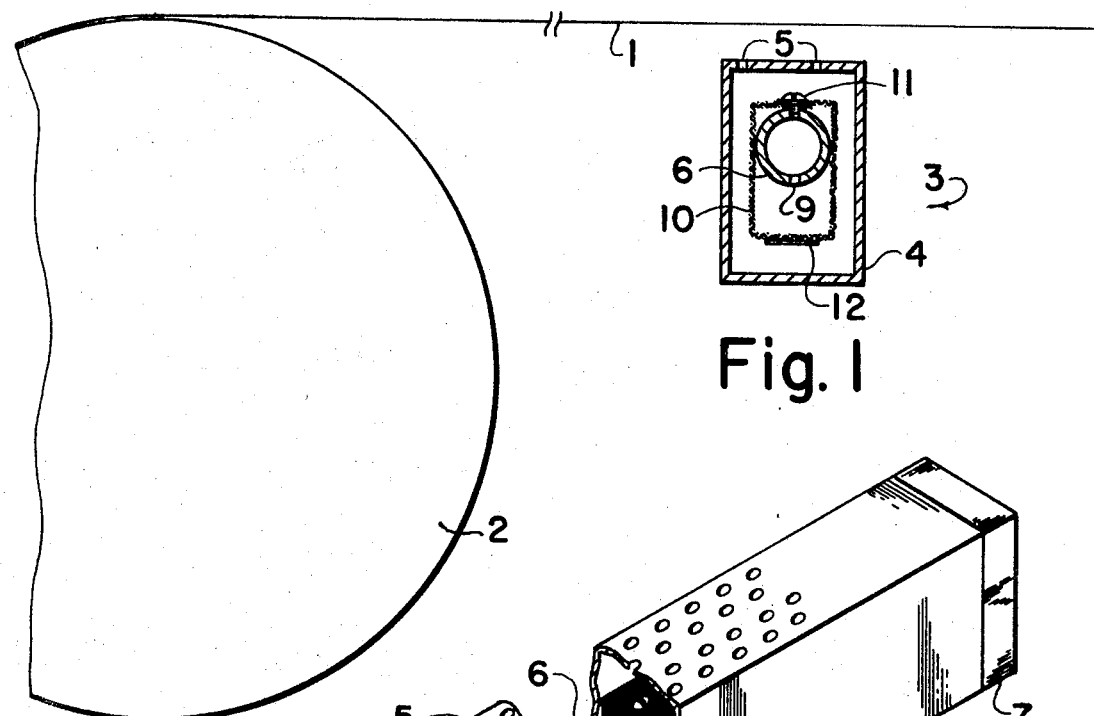
FIG. 1 is a cross-sectional view showing a preferred embodiment of the invention in a typical installation.
Figure 2:
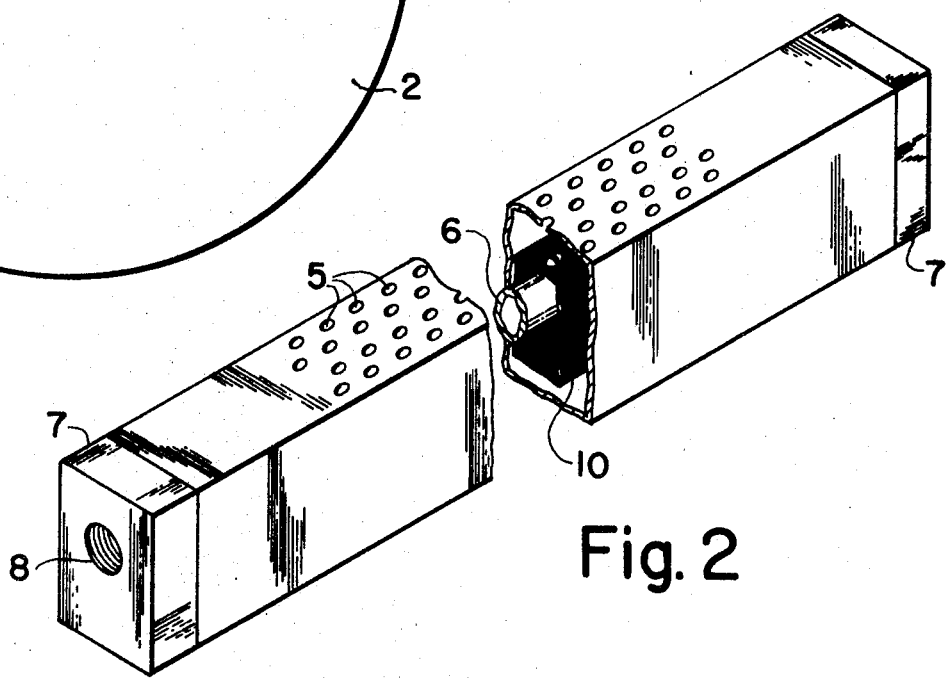
FIG. 2 is a perspective view of a preferred embodiment of the invention with portions broken away for purposes of clarity.
Figure 3:
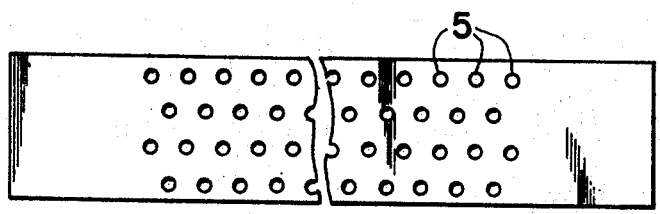
FIG. 3 is a plan view of a portion of the apparatus of FIG. 2 showing the arrangement and spacing of the outlets on the distributing conduit or chamber.

With reference first to FIGS. 1–3 of the drawings, it will be seen that a web of sheet material 1 is trained over a roll 2 past the distribution system of the present invention, referenced in its entirety by the numeral 3. By way of the example, the web of material might be paper passing from the paper machine to a supercalender with the distributor functioning to apply steam to the web to enhance the subsequent supercalendering effect. Of course, this is by way of illustration only and it will be obvious that the present invention finds application in a variety of environments.

The distribution system 3, as seen in FIGS. 1 and 2, may comprise an outer distribution conduit or chamber 4 having a series of outlets 5 uniformly spaced along its length. While the distributing conduit 4 is shown as rectangular in cross section, the particular configuration thereof forms no part of the invention and may be any desired shape, such as circular.

Disposed within the distributing conduit 4 is a feed conduit or manifold 6 which may take the form of a single pipe extending throughout the active length of the conduit 4. As in the case of the chamber 4, it will be apparent that the cross-sectional configuration of the conduit 6 may take forms other than that illustrated, e.g. square, and also that two or more pipes may be used instead of the single conduit 6. The ends of the distributing conduit or chamber 4 may be closed off by means of end caps 7 which may be secured thereto in any suitable manner and which may also serve to mount the feed conduit 6 in spaced relationship to the interior walls of the chamber 4. One or both of the end caps 7 may be tapped, as at 8, to provide a source of steam supply to the feed conduit 6. The feed conduit 6 may have a series of openings, as at 9, spaced along its length and diametrically opposed to the outlets 5 in the distribution chamber 4. Alternatively, of course, the series of outlets 9 might be replaced by a single elongated slot extending throughout the length of the feed conduit 6.

A screen member 10 is folded about the conduit 6 and is secured thereto by means of screws of the like 11 to serve as baffle means for steam issuing from the conduit 6. It will also be noted that opposite each of the outlets 9 spots of solder or the like 12 may be affixed to the screen 10 for a purpose to be presently described.

In the various processes in which the present invention is intended for use, it will usually be desired to apply the steam in a uniform blanket to the web being treated. As noted previously and as described in the Keller article referred to above, it is possible to obtain uniform outlet pressures and velocities in a manifold by dimensioning the manifold so that the pressure losses experienced in the manifold through friction and the pressure gains due to deceleration of the fluid as it flows through the manifold are substantially balanced. However, as also noted above, because the dimensions of the manifold are often determined by factors other than the theoretical design considerations necessary to obtain uniform manifold pressure, it is impractical, if not impossible, in many environments to obtain a uniform pressure profile along the length of the manifold.

In the embodiment illustrated in FIGS. 1 and 2, for example, the minimum active length of the manifold would be determined by the width of the web being treated, and the required heat transfer characteristics would dictate the spacing of the outlets. Additionally, the volume of steam to be applied to the web, the duration of treatment or width of the application area and limitations on steam velocities would to a large extent determine the cross-sectional area and the number and size of outlets in the distributing conduit or chamber.

In view of this it will be apparent that conventional design procedures will often be inadequate. Thus, although it is known that length to diameter ratio and area ratio may be proportioned, or the size and spacing of the manifold outlets varied, or the cross-sectional area of the manifold varied, to obtain a uniform pressure profile, when these dimensions are determined by other considerations, rarely will the resulting manifold give the desired pressure profile.

In accordance with the principles of the present invention, however, these conflicting considerations may be resolved and an even manifold pressure profile obtained.

As seen in FIGS. 1 and 2, for example, this is accomplished by hydrodynamically designing the feed conduit 6 in accordance with known procedure so that the fluid delivered by the conduit 6 exits the outlets 9 thereof at substantially uniform pressure. Thus, the interior of the chamber 4 is, in effect, supplied at a plurality of points along its length with fluid at uniform pressure. In this way the chamber pressure is maintained substantially constant throughout its length and fluid is ejected from each of its outlets 5 at substantially uniform pressures.

To prevent the occurrence of localized high pressure areas in the manifold in the vicinity of the outlets 9, it will be noted that the jets issuing from the apertures 9 are directed away from the outlets 5. Additionally, the screen member 10 helps to diffuse the steam issuing from the outlets 9 and in conjunction with the use of the impervious areas, as at 12, will eliminate the possibility of the jets from the outlets 9 interacting with condensate collected in a bottom of the chamber 4 and causing this condensate to become entrained in the steam passing through the outlets 5. In this connection, any suitable means may be used for removing condensate which may collect in the bottom of the distributing conduit or chamber 4.

The feed conduit may be designed in any of a number of ways to insure that the fluid issuing from its outlets 9 is at uniform pressure. For example, it has been found that when delivering steam through a smooth steel pipe of constant diameter having equally sized, uniformly spaced outlets therein, if the $L/D$ ratio is maintained at about 100 and the area ratio at about 1, the pressure at each of the outlets 9 will be substantially constant.

In a typical example, an 80" feed conduit was used for a distribution chamber having a desired active length of 82". Using a standard ¾" diameter steel pipe with a nominal inside diameter of 0.824" resulted in an $L/D$ ratio of 97.0. The internal cross-sectional area of a ¾" diameter pipe is $0.534"^2$. Thus, using 41⅛" diameter apertures spaced 2" apart along the pipe resulted in a total outlet area of $0.508"^2$ and an area ratio of 0.97. When this conduit was inserted in the manner shown in FIGS. 1 and 2 in a 2" by 3" rectangular chamber having 65⅛" diameter outlets along an 82" length, and steam under pressure supplied to one end of the feed conduit the pressure at the distribution chamber was found to be substantially uniform.

Referring now to FIG. 4 of the drawings, a second preferred embodiment of the present invention will be described. As seen in FIG. 4, the distribution chamber 20 is substantially rectangular in cross-sectional shape and has a series of outlets 21 formed throughout its active length. End plates 22 are used to seal the ends of the chamber and quick release lock nuts 23 secure the end caps 22 to the chamber in a manner such that they may be readily removed for cleaning the interior of the chamber 20. Additionally, it will be seen that drains 24 map be provided for the removal of condensate from the bottom of the distribution chamber 20. Attached to one side of the chamber 20 and extending coextensively therewith, is a feed conduit 25 having a series of outlets 26 spaced along its length and communicating with the interior of the chamber 20 through the inlets 27 formed in one wall thereof. A substantially L-shaped baffle member 28 is supported within the chamber 20 with one leg thereof overlying the inlets 27. As seen in FIGS. 4 and 5, the other leg of the baffle 28 may be tapped at intervals along its length to receive bolts 29 which pass through the distributing conduit 25 and serve to both mount the baffle 28 in place and secure the feed conduit to the distribution chamber 20.

The feed condut 25 is hydrodynamically designed in the manner described above in connection with the embodiments of FIGS. 1 and 2 to deliver steam at substantially equal pressures and velocities at each of its outlets 26. Thus, as in the previous embodiment, the interior of the distribution chamber 20 is supplied with steam at several points along its length and the interior of the chamber 20 is thus placed under substantially uniform pressure; resulting in substantially equal pressures and velocities at each of its outlets 21.

Referring now to FIG. 6 of the drawings, a further preferred embodiment of the present invention will be described. While in the example above, the feed conduit comprised a pipe of constant cross-sectional area it will be noted that an even pressure profile along the feed conduit may also be obtained by using a conduit of the type shown at 31 in FIG. 6. Thus, rather than balancing friction losses and deceleration gains in the feed conduit by proportioning the $L/D$ and area ratio, a tapered conduit, decreasing in cross-sectional area from its inlet end 32 to its opposite end 33 may be used so that deceleration gains are reduced to a point where they are approximately balanced by friction losses. Thus, as in the previous embodiments, the distribution conduit, reference 30 in FIG. 6, is supplied at several points throughout its length with steam at equal pressures and velocities; resulting in a uniform internal pressure in the distribution chamber 30 and consequently, uniform pressures and velocities at each of its outlets 34. This type of design is particularly advantageous in situations which require only a fairly short feed conduit since, in maintaining an $L/D$ ratio of 100 with fairly short conduits, an impractically small diameter conduit may result.

While certain preferred embodiments have been described for purposes of illustration, it will be apparent that modifications thereof will occur within the scope of the present invention. For example, while a single feed conduit is shown for each distributing conduit, it will be apparent that two or more conduits may be used in combination with each distributing conduit or chamber. Additionally, while a series of apertures are shown as outlets in the distributing and feed conduits, it will be apparent that they may be replaced by elongated slots. It is intended therefore, that the present invention be restricted only within the scope of the appended claims.

We claim:
1. In a distribution system for fluids comprising
  (a) first conduit means,
  (b) inlet means for supplying fluid under pressure to the interior of said first conduit means,
  (c) second conduit means positioned to receive fluid from first conduit outlet means distributed along the length of said first conduit means, and
  (d) second conduit outlet means distributed along the length of said second conduit means to provide uniform fluid flow per unit length therefrom along the length of said second conduit means,
wherein the improvement comprises:
  (e) first conduit outlet means distributed substantially uniformly along the length of said first conduit means to supply fluid therefrom to said second conduit means and having substantially uniform outlet area per unit length of said first conduit means in the region of communication with said second conduit means,
  (f) said first conduit means being proportioned to have an internal fluid pressure which is substantially uniform along the length thereof when fluid is admitted under pressure to the interior thereof through said inlet means,
  (g) whereby fluid applied to said inlet means is transmitted to said second conduit means at a substantially uniform rate per unit length along the length of said first conduit outlet means.

2. The apparatus of claim 1 wherein said first conduit means is tapered from a largest cross-sectional area adjacent its inlet end to a smallest cross-sectional area adjacent its opposite end.

3. The apparatus of claim 1 wherein:
  (a) said first conduit means is of substantially uniform cross-sectional area;
  (b) the ratios of length to diameter and inlet to outlet areas of said first conduit means are so proportioned that the internal fluid pressure in said first conduit means will be substantially uniform throughout the length thereof when fluid is admitted under pressure to the interior thereof through said inlet means; and
  (c) said first conduit outlet means is a slot.

4. The apparatus of claim 1 wherein:
  (a) said first conduit means is of substantially uniform cross-sectional area;
  (b) the ratios of length to diameter and inlet to outlet areas of said first conduit means are so proportioned that the internal fluid pressure in said first conduit means will be substantially uniform throughout the length thereof when fluid is admitted under pressure to the interior thereof through said inlet means; and
  (c) said first conduit outlet means is a plurality of apertures all of which have substantially the same area.

5. The apparatus of claim 4 wherein said first conduit means is positioned internally of said second conduit means.

6. The apparatus of claim 5 including foraminous baffle means disposed between said first conduit outlet means and said second conduit outlet means.

7. The apparatus of claim 6 wherein said baffle means has imperforate portions directly opposite said first conduit outlet means.

8. The apparatus of claim 4 wherein said first conduit means is positioned externally of said second conduit means.

9. The apparatus of claim 8 wherein:
  (a) said second conduit means is provided with inlet means along the length thereof; and
  (b) said second conduit inlet means is aligned with said first conduit outlet means.

10. The apparatus of claim 9 wherein said first conduit means is at least as long as said second conduit means.

11. The apparatus of claim 10 wherein baffle means are positioned within said second conduit means in spaced overlying relationship to said second conduit inlet means.

References Cited

UNITED STATES PATENTS

| | | | |
|---|---|---|---|
| 1,729,149 | 9/1929 | Brown et al. | 239—558 |
| 1,751,960 | 3/1930 | Veenstra | 239—566 |
| 2,798,768 | 7/1957 | Babin | 239—566 |
| 2,979,269 | 4/1961 | Bals | 239—566 |
| 3,347,473 | 10/1967 | Steck | 239—560 |

LLOYD L. KING, Primary Examiner

U.S. Cl. X.R.
239—561, 566